United States Patent
Heath et al.

[15] 3,661,558
[45] May 9, 1972

[54] PROCESS AND APPARATUS FOR DISTRIBUTING SLURRY TO A REACTION FURNANCE

[72] Inventors: Thomas D. Heath; Walfred W. Jukkola, both of Westport, Conn.

[73] Assignee: Dorr-Oliver Incorporated, Stamford, Conn.

[22] Filed: Feb. 16, 1970

[21] Appl. No.: 11,508

[52] U.S. Cl. ...................................75/9, 75/26, 137/262, 263/21 A, 266/20
[51] Int. Cl. .....................................C22b 1/10, F27b 15/08
[58] Field of Search ....................75/9, 26; 266/20; 137/262; 23/1 F, 1 FT; 159/DIG. 3; 263/21 A

[56] References Cited

UNITED STATES PATENTS 3,202,167   8/1965   De Young et al. ..................137/262 X
2,368,508   1/1945   Wile .......................................75/26 X Primary Examiner—Winston A. Douglas
Assistant Examiner—M. J. Andrews
Attorney—D. M. Mezzapelle, J. D. Malone and T. M. Jablon

[57] ABSTRACT

A feed distribution system for feeding slurry to a fluidized bed reactor through a plurality of feed guns placed around the periphery of the reactor. The feed distribution system includes a feed distribution tank and having no mechanically moving parts located above the reactor. The tank is divided by baffles into essentially two concentric zones, namely an inner zone which serves as a feed reservoir and an outer zone which is further subdivided into individual compartments and serves to feed slurry at a steady rate to said feed guns.

Also disclosed is a process utilizing said feed distribution system.

20 Claims, 4 Drawing Figures

INVENTORS.
THOMAS D. HEATH
WALFRED W. JUKKOLA
BY
ATTORNEY.

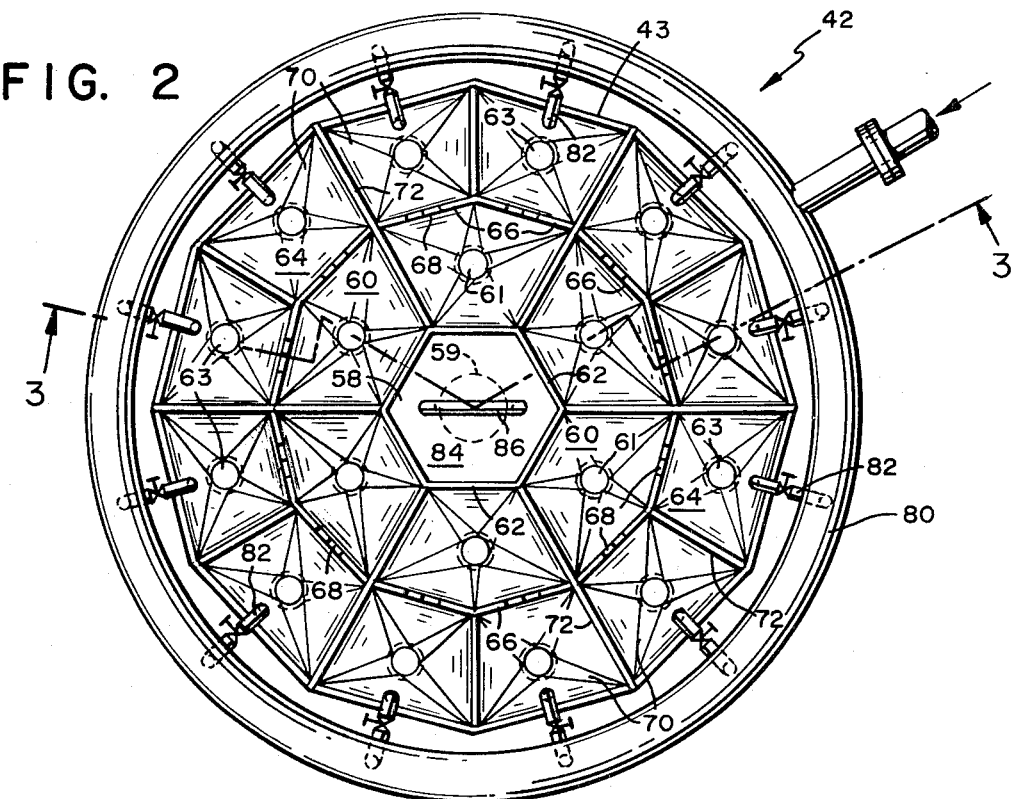
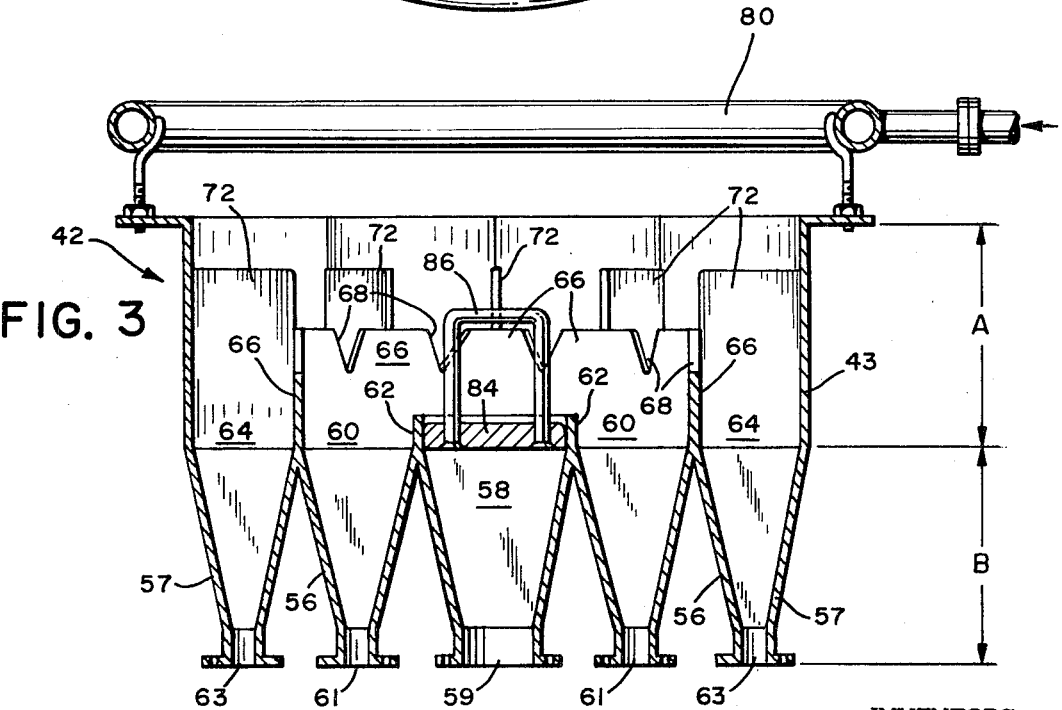
INVENTORS.
THOMAS D. HEATH
WALFRED W. JUKKOLA
BY  D. M. Messapelle
ATTORNEY.

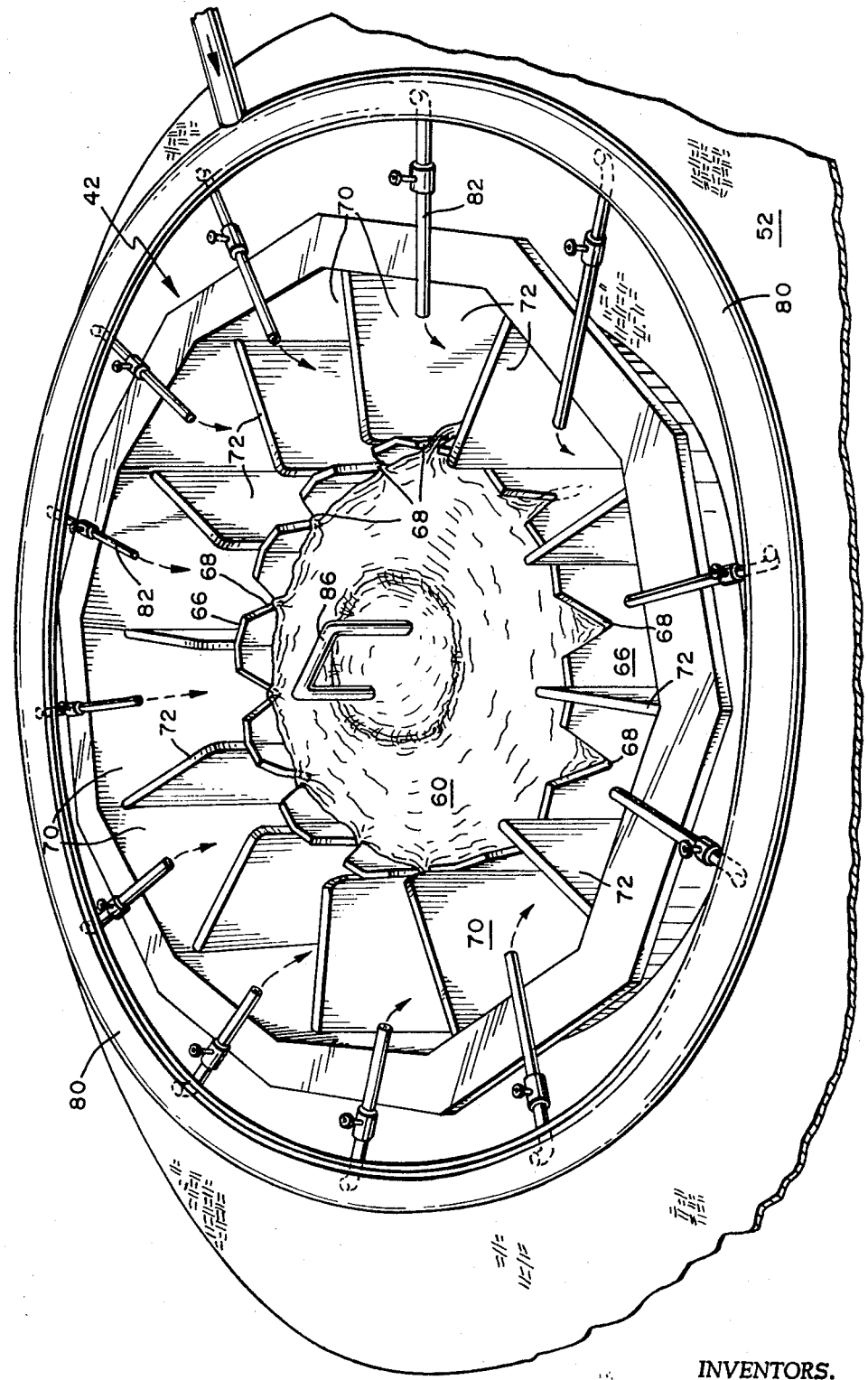

PROCESS AND APPARATUS FOR DISTRIBUTING SLURRY TO A REACTION FURNACE

FIELD OF THE INVENTION

This invention relates to a process and apparatus for feeding particulate solid material in slurry form to a reaction furnace, such as a fluidized bed reactor, and, particularly, to an apparatus for distributing said slurry to a plurality of feed points located around the periphery of such a reactor.

BACKGROUND

In recent years, the fluid bed technique has been widely adopted by the processing industry as an extremely efficient and effective processing tool.

In the metallurgical industry, the fluidization principle has probably received its greatest impetus with the development of larger and larger reactors, up to 45 feet in diameter, for the roasting of sulphide ores.

However, the difficulties and problems associated with the operation of smaller conventional reactors were magnified by the introduction of these larger reactors. These difficulties while tolerable in smaller diameter reactors could not be allowed to exist in larger reactors if these new installations were to be commercially successful. Therefore, the demand by the industry for larger diameter reactors prompted the development of new concepts of design, construction and operation to meet the needs of these reactors.

For example, in certain processes, particularly exothermic processes, such as the roasting of zinc sulphide concentrates or other oxidizable material, and also in cases where endothermic reactions are carried out, difficulty has been experienced in obtaining uniform and complete oxidation of the ore without at the same time encountering difficulties due to non-uniformity often shows up in other parts of the system, particularly in the gas system, where the gaseous products are not the desired end products and/or the treated solids or calcines are not treated uniformly. In certain instances, localized over or under oxidation has been experienced with the attendant disadvantage that the sulphur in the ore is converted to sulphur trioxide or, in the case of under oxidation, the sulphur values in the ore are not released and therefore lost.

It has been noted that most of these difficulties are due to the fact that the incoming feed is not uniformly distributed throughout the reaction mass. By "reaction mass" is meant the mass of finely divided solids which due to the nature of fluidization are, under ideal conditions, comprised of fully reacted solids.

These difficulties are also attributable to the fact that a steady or even feed to the fluidized bed is difficult to achieve so that in effect the bed is either underfed or overfed.

It will be readily recognized that with the introduction of larger and larger reactors these difficulties are aggravated since the prime requirement of steady and uniform distribution of the feed over the entire fluidized bed becomes more difficult to attain.

To overcome these difficulties, it has been proposed to spray the feed onto the surface of the fluidized bed in such a manner that it is uniformly taken into the bed due to the turbulent action thereof and thereafter distributed throughout the bed or reaction mass for treatment.

However, this and similar proposals have not proven to be commercially successful and the above-mentioned difficulties have continued to be encountered.

SUMMARY OF THE INVENTION

The invention is predicated on the discovery that these and other difficulties may be overcome by the novel feed distribution system of this invention which comprises a feed distribution tank located above the top or dome of the reactor. Finely divided ore, such as zinc concentrate, suitably slurried is pumped to said feed distribution tank in a manner to minimize variations in the flow rate of the slurry. In the feed distribution system, the flow is smoothed to a steady rate before entering the reactor. The feed distribution tank is constructed and arranged so that the slurry forms a reservoir from where it overflows a weir into a plurality of feed compartments. In accordance with this invention, each compartment receives substantially the same amount of slurry by providing V-shaped notches in said weir for each compartment.

From each feed compartment, the slurry flows by gravity through a conduit to a slurry feed gun operating with injection air, and located so as to feed the slurry above the fluid bed. The injection air serves to spray the feed slurry over a wide area of the fluid bed. The feed guns are preferably placed at different elevations around the periphery of the reactor in an arc of about 220°. The remaining 140° arc is reserved for the calcine discharge outlet.

Thus, by means of this novel feed distribution system, Applicants have been able to obtain uniform distribution of the feed over the fluidized bed at an even rate of feed.

BRIEF DESCRIPTION OF THE DRAWINGS

In order that it may be clearly understood and readily carried into effect, the invention will now be described by way of example with reference to the accompanying drawings in which:

FIG. 2 is a plan view of the feed distribution tank of this invention;

FIG. 3 is a vertical sectional view taken along line 3—3 of FIG. 2;

FIG. 4 is a perspective view of the feed distribution tank of this invention particularly showing the overflow V-shaped notched weir.

DESCRIPTION OF THE PREFERRED EMBODIMENT

Figure 1:
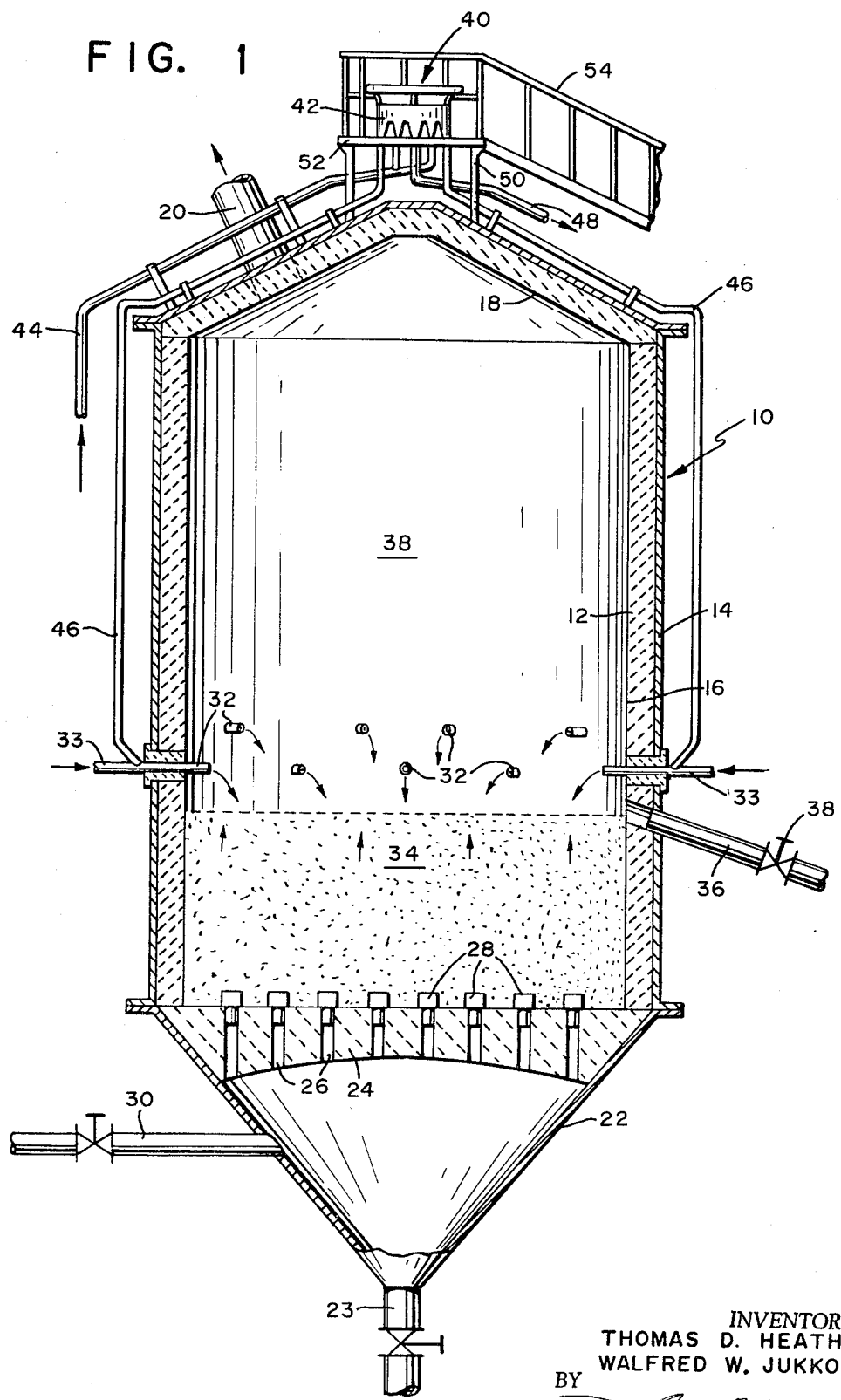
FIG. 1 is a vertical sectional view of a typical fluidized bed reactor showing, in elevation, the feed distribution system of this invention.

Referring now to the drawings, particularly FIG. 1, there is shown a typical fluidized bed reactor 10 comprising a cylindrical shell 12 having a metal outer wall 14 and lined with refractory material 16. The reactor has a top 18 provided with an exit conduit 20, for spent fluidizing gases. The reactor bottom is provided with a windbox or coned section 22 having a valved cleanout conduit 23.

Located in the bottom of the cylindrical section 12 and extending throughout its cross-sectional area is a solid supporting constriction plate 24 which is provided with gas admitting apertures or tuyeres 26. Each of these apertures is normally provided with a suitable insert 28 for preventing the sifting of solid material through the constriction plate 24 into the windbox 22.

Fluidizing gas is blown into windbox 22 through a valved conduit 30 while the solids to be treated are fed into the cylindrical section through a plurality of feed guns 32 located around the periphery of the reactor to form a bed 34 of solids therein. The upper level of bed 34 is controlled by an overflow discharge pipe 36 having a valve 38. Above the bed 34 is a freeboard space 38 which communicates with the exit conduit 20. In operation, bed 34 is fluidized by the gases entering windbox 22 and passing through the tuyeres 26 in constriction plate 24.

If heat is required for start-up or for continued operation, it may be supplied by preheating the fluidizing gases, by using preheat burners or burning fuel directly in the bed in accordance with well known practice.

In accordance with this invention, the solids to be treated, in slurry form, are fed by gravity to the fluidized bed 34 from a feed distribution tank 42 located on the top 18 of the reactor 10. The distribution tank 42 forms part of the feed distribution system of this invention which further comprises an inlet conduit, here shown as a single conduit 44, for feeding slurry from an agitated storage vessel, not shown, to said feed tank 42; slurry outlet conduits 46 which communicate with said feed guns 32; and a feed recycle conduit 48 which communicates with said storage vessel and is used during the start-up operations. These conduits, preferably rubber hoses, drape over the exterior of shell 12.

As shown in FIG. 1, the feed distribution tank 42 is supported on the top of the reactor by a plurality of columns 50 which also serve to support a service walk 52 surrounding the distribution tank 42 and a service bridge 54.

The construction and arrangement of the feed distribution tank of this invention is clearly shown in FIGS. 2, 3 and 4.

Distribution tank 42 of this embodiment may be considered as having an upper section "A" of a general cylindrcal configuration and a lower section "B" in the form of a plurality of individual conical chambers or hoppers 56 and 57 arranged side by side in two adjoining rows around a center chamber or hopper 58.

In the plan view of FIG. 2, these adjoining rows appear as concentric rings or zones 60, 64 around a center core, chamber 58, and separated from each other by circumferential baffles 62 and 66. Outer wall 43 of tank 42 forms the outer boundary of ring 64.

The inner row or ring 60 is separated from the center chamber 58 by a relatively short circumferential baffle wall 62 and from the outer row or ring 64 by a circumferential baffle weir 66 provided with a plurality of overflow V-shaped notches 68. As may be seen in FIG. 3, the baffles are constructed so that baffle weir 66 extends substantially higher than the inner baffle 62. Moreover, as depicted in the perspective view of FIG. 4, inner ring 60 is free of radial baffles so that a continuous uninterrupted body of slurry is present in this ring. On the other hand, the outer row or ring 64 is divided into a plurality of feed compartments 70 by radial baffles 72 extending between the circumferential weir 66 and the outside wall 43 of the distribution tank 42. Slurry from said inner ring 60 overflows into each of said feed compartments 70 over said V-shaped notches 68 provided in weir 66. It is important to this invention that said V-notches be at precisely the same level in said weir 66 in order that each compartment 70 receives substantially the same amount of slurry.

Tank 42 is further provided with a water distribution ring 80 suitably secured to the wall 43 of said tank 42. Dilution and/or control water may be added to each of said feed chambers 70 from said water distribution ring 80 through a valved nozzled pipe 82.

As will appear more clearly hereinafter, in normal operation, the upper end of center chamber 58 is closed at the top by a plug 84 having a handle 86.

The bottom opening of each of said conical chambers 56, 57 and 58 communicate with the appropriate conduits as hereinbefore described. Thus, opening 59 in center chamber 58 communicates with recycle conduit 48; openings 61 in conical chambers 56 communicate with inlet conduits 44 and openings 63 in conical chamber 57 communicate with outlet conduits 46.

In operation, slurry, such as zinc sulphide concentrate, is pumped, preferably by several pumps, not shown, from an agitated storage vessel, not shown, through inlet conduits 44 into the inner ring 60 formed by hoppers 56.

During start-up operation, before the slurry is fed to the reactor, the slurry is recycled through conduit 48 to the aforesaid storage vessel. This is done by simply removing plug 84 thus allowing the slurry to overflow baffle wall 62 into chamber 58. After the system is in balance, plug 84 is replaced permitting the level of slurry to rise in ring 60 overflowing baffle 62 and forming a reservoir of slurry in the central portion of the tank. The slurry eventually rises to the level of the V-shaped notches 68 in weir 66 and overflows into each compartment 70. The upflow feeding slurry through conical chambers 61 has the advantage that it maintains said reservoir of slurry in a slightly agitated condition thus preventing settling of solids in said ring.

From each feed chamber 70, slurry flows by gravity through conduit 46, which may be provided with a control device, such as a pinch clamp, not shown, to the slurry feed gun 32 located so as to feed slurry above the fluid bed 34.

The level of the feed in conduit 46 remains relatively constant since the slurry overflows each of said V-shaped notches 68 at an equal and constant rate.

The slurry is blown into the reactor by the feed guns 32 operating with injection air supplied through an aspirator 33. The injection air serves to spray the slurry over a wide area of the fluid bed 34. Uniform distribution of the feed over the bed is further enhanced by placing the guns 32 around the periphery of the reactor in an arc about 220° and at different elevations in order to vary the depth of the spray into the reactor. The remaining 140° arc of the reactor is reserved for the calcine discharge conduit or conduits 36.

Thus, by means of the novel feed distribution system of this invention, applicants have been able to attain uniform distribution of the feed over the fluidized bed at an even rate of feed.

Moreover, since injection air is used to spray feed over the bed, the feed system is sensitive to any changes in the air pressure in the reactor. Thus, any change in the gas pressure in the reactor is compensated by a rise or fall in the level of slurry in conduits 46 until the system reaches equilibrium. Thus, for example, in normal operation the system is in equilibrium in that the gas pressure in the reactor, the level of the slurry in the feed conduits 46, and the rate of feed into the reactor are constant. If for any reason, the gas pressure inside the reactor increases, the feed rate to the reactor will momentarily decrease causing the level of slurry in conduits 46 to rise until the increased pressure in conduits 46, due to the increased head, increases the rate of feed through the feed guns into the reactor.

On the other hand, should it be desirable to increase the rate of feed to the reactor while maintaining a constant gas pressure in the reactor, all that is required is to increase the rate at which slurry is fed to the reservoir in the central portion of tank 42. Under these conditions, the level of the slurry in conduits 46 rises until a new equilibrium level is reached. At this new level, the increased pressure head in said conduits 46 is sufficient to increase the rate of flow of the slurry through the feed guns 32 until the system is again in equilibrium.

Thus, it will be readily recognized that the feed system of this invention is self adjusting in that changes in the system are automatically compensated by changes in the slurry level in conduits 46.

The invention further facilitates control over the amount of air fed to the reactor since variations in the feed composition, feed rate and flow rate are substantially eliminated.

Moreover, since the feed distribution tank of this invention has no mechanically moving parts, the tank requires little or no service at all.

It will be obvious to those skilled in the art that while we have shown and described a circular feed distribution tank, the configuration of the tank is not essential to the invention and other configurations may be readily adopted.

We claim:

1. Apparatus for distributing slurry comprising,
  a reaction furnace having a plurality of feed points located around the periphery thereof;
  a tank supported above the top of said furnace and divided into an upper section having an outer wall and a lower section depending therefrom and formed of a plurality of individual conical chambers arranged in a row around a core portion, the upper end of said row forming in said upper section a feed compartment alongside said core portion;
  an overflow baffle weir separating said feed compartment from said core portion;
  a plurality of radial baffles in said feed compartment extending between said baffle weir and said wall and defining therebetween individual feed compartments, each of said individual feed compartments communicating with a corresponding conical chamber in said row;
  inlet conduit means for feeding slurry to said core portion; and
  outlet conduit means between each of said conical chambers and said feed points, said outlet conduit means communicating at one end with the lower end of one said conical chambers and at the other end with one of said feed points for distributing slurry from said individual feed compartments to said feed points.

2. Apparatus according to claim 1 wherein said feed points comprise feed guns provided with aspirating means for injecting said slurry into said furnace.

3. Apparatus according to claim 2 wherein said feed guns are located at different elevations around the periphery of the reactor.

4. Apparatus according to claim 1 wherein said core portion is provided with means for recycling slurry to said slurry inlet means.

5. Apparatus according to claim 1 wherein said baffle weir is provided with a plurality of V-shaped notches between said core portion and each of said individual feed compartments.

6. Apparatus according to claim 1 further including means for adding water to each of said individual feed compartments.

7. Apparatus for distributing slurry to a fluidized bed reactor to obtain uniform distribution of said slurry in said reactor, which comprises;
   a fluidized bed reactor having a plurality of feed guns located around the periphery thereof;
   a tank supported above the top of said reactor and divided into an upper section having a general cylindrical outer wall and a lower section depending therefrom and formed of a plurality of individual conical chambers arranged side by side in two adjoining concentric rows around a centrally located conical chamber, the upper ends of said concentric rows forming in said upper section two concentric rings around a center core formed by the upper end of said center chamber;
   a circumferential baffle wall separating the inner ring of said concentric rings from said center core;
   a circumferential overflow baffle weir separating said inner ring from the outer ring of said concentric rings, said baffle weir extending a substantial height above said baffle wall;
   a plurality of radial baffles in said outer ring extending between said circumferential baffle weir and said cylindrical wall defining therebetween individual feed compartments, each of said compartments communicating with a corresponding conical chamber in said outer row;
   inlet conduit means for feeding slurry to said inner ring; and
   outlet conduit means between each of the conical chambers in said outer row and said feed guns, said outlet conduit means communicating at one of its ends with the lower end of said conical chamber and at its other end with said feed gun thereby distributing slurry from said feed compartment to said reactor.

8. Apparatus according to claim 7 wherein said distribution tank is supported on said reactor.

9. Apparatus according to claim 7 wherein said circumferential baffle weir is provided with a plurality of V-shaped notches, one for each of said feed compartments, arranged so that each compartment receives substantially the same amount of slurry.

10. Apparatus according to claim 7 further comprising a water distribution ring secured to said distribution tank and provided with nozzle means for adding water to each of said feed compartments.

11. Apparatus according to claim 7 wherein the upper end of said center chamber is provided with removable sealing means.

12. Apparatus according to claim 7 further comprising an agitated storage vessel and pump means communicating with one end of said inlet conduit means.

13. Apparatus according to claim 7 wherein the other end of said inlet conduit means communicates with the lower end of the conical chambers in said inner row.

14. Apparatus according to claim 12 wherein the lower end of said center chamber is provided with conduit means communicating at one end with the lower end of said center chamber and at the other end with said agitated storage vessel.

15. Apparatus according to claim 7 wherein said feed guns are provided with aspirating means for injecting said slurry feed over said fluidized bed.

16. A process of feeding a slurry of finely divided solids into a fluidized bed, which comprises;
   maintaining in an enclosed chamber a bed of said solids undergoing reaction in a fluidized condition by supplying thereto a gas at solids fluidizing velocity;
   providing in said chamber a gas collecting space immediately above said bed;
   controlling the fluid level of said bed by discharging reacted solids from said level;
   continuously and uniformly feeding said slurry into said chamber over said bed through a plurality of feed points located around the periphery of said chamber;
   providing a feed distribution area above said chamber;
   dividing said feed distribution area into a plurality of zones including a feed inlet zone and a feed discharge zone;
   separating said zones by an overflow baffle weir;
   further dividing said discharge zone into a plurality of individual feed zones;
   continuously supplying slurry to said inlet zone so that said slurry overflows said weir into each of said individual feed zones at a steady rate;
   transferring said feed slurry from said individual feed zones to said feed points through a plurality of feed conduits communicating between each of said individual feed zones and said feed points;
   connecting each of said individual feed zones with a feed point; and
   transferring said feed slurry through said connecting means from said individual feed zones to said feed points.

17. The process of claim 16 wherein the slurry in said inner zone is maintained in a slightly agitated condition by pumping said slurry into the bottom of said feed inlet zone.

18. The process of claim 16 wherein said slurry is fed over said bed by injecting air through said feed points.

19. The process of claim 16 wherein the slurry in said connecting means reaches an equilibrium level during normal operation.

20. The process of claim 19 wherein changes in the operating condition in the reaction system are compensated by changes in the slurry level in said connecting means until said equilibrium is reestablished.

* * * * *